United States Patent Office

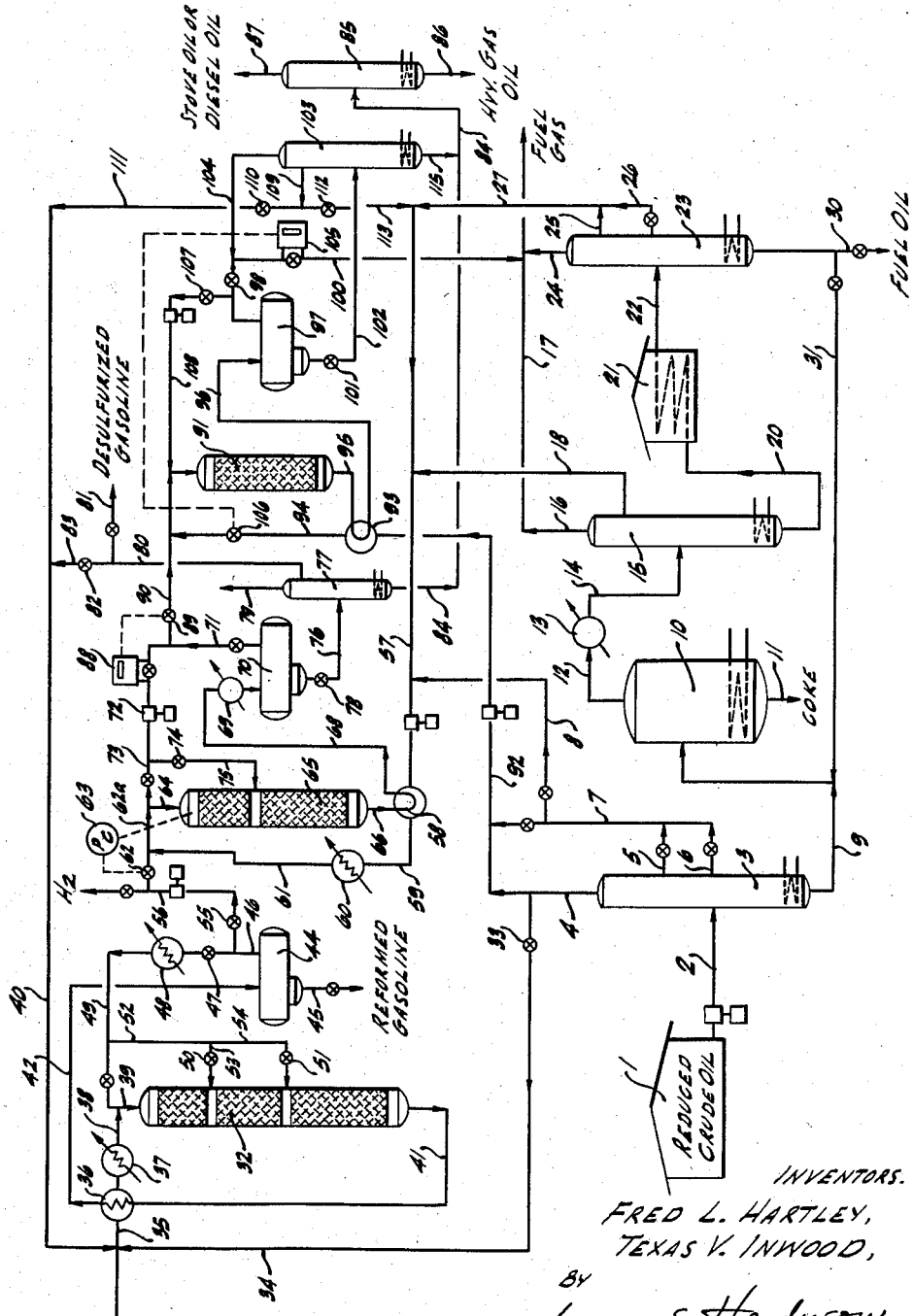

2,883,337
Patented Apr. 21, 1959

2,883,337

PROCESS FOR HYDRODESULFURIZING HYDROCARBONS EMPLOYING AN IMPURE HYDROGEN STREAM

Fred L. Hartley, Palos Verdes Estates, and Texas V. Inwood, La Habra, Calif., assignors to Union Oil Company of California, Los Angeles, Calif., a corporation of California Application June 21, 1954, Serial No. 438,219

7 Claims. (Cl. 208—216)

This invention relates to the desulfurization of mineral oil hydrocarbon fractions by the selective hydrogenation thereof in the presence of certain catalysts. Such processes are often referred to as "hydrodesulfurization." They embody essentially the treatment of hydrocarbon fractions at temperatures between about 500° and 850° F., generally at super-atmospheric pressures, in the presence of hydrogen and a catalyst, whereby organic sulfur components are selectively hydrocracked to produce hydrogen sulfide and hydrocarbon fragments. At the same time, any organic nitrogen bases are decomposed to ammonia and hydrocarbons. The original hydrocarbon components are affected only in that the unsaturates, and some of the aromatics are hydrogenated. These processes are distinguished from the type of conversion known as reforming, or hydroforming, wherein somewhat higher temperatures, and/or lower space velocities are employed in order to effect rearrangement of hydrocarbons, as by cyclization, aromatization, isomerization and the like, whereby the knock rating of the gasoline is improved.

The hydroforming type of operation mentioned above usually results in a net make of hydrogen due to the dehydrogenation of naphthenes to produce aromatics, and possibly from other reactions. It is therefore necessary in such hydroforming operations to bleed off continuously a portion of the recycle hydrogen stream in order to prevent the buildup of the system pressure. These hydroformer make-gases generally comprise between about 60% and 90% by volume of hydrogen, the remainder being largely methane.

The principal object of this invention is to provide means for the economical utilization of such make-gases from a hydroformer whereby substantially all of the hydrogen contained therein may be utilized for carrying out the aforementioned desulfurization operations without employing extraneous hydrogen purification steps for eliminating the methane. A further objective is to utilize such off-gases in a two-stage desulfurization operation whereby both cracked and straight-run distillates may be conveniently desulfurized. A still further object is to provide for such hydrogen utilization in a two-stage desulfurization system, and at the same time maintain both of the desulfurization zones under substantially non-regenerative operation. Another object is to avoid the removing of hydrogen sulfide from recycle gas streams in desulfurization reactions. A still further object is to provide, in a straight-run hydrocarbon desulfurization process, an indigenous oil absorption system for concentrating a hydrogen-lean gas stream. Other objects and advantages will be apparent to those skilled in the art from the description which follows:

Briefly, this invention relates to an integrated petroleum refining and desulfurization process wherein the hydrogen-rich off-gases from a hydroformer are employed in the first instance to desulfurize refractory distillates at relatively high temperatures and high hydrogen partial pressures, and wherein a bleed stream from the recycle system of the high-temperature desulfurizer is employed in a second catalytic reactor to desulfurize straight-run distillates at a lower temperature and lower hydrogen partial pressure, and wherein the hydrogen concentration in the recycle stream of the high-temperature desulfurizer is correlated with the hydrogen/feed ratio in the second desulfurizer in such manner as to obtain an effective utilization of substantially all of the hydrogen supplied from the hydroformer. The various modifications and amplifications of this basic procedure will be explained more fully hereinafter.

In the past, the complete utilization of the hydrogen contained in hydroformer off-gases has not generally been realized unless extraneous purification units are employed. The original off-gases from the hydroformer, which may contain for example 85% hydrogen, are difficult to purify further by inexpensive procedures. Oil absorption to remove the methane is uneconomical because the ratio of hydrogen to methane is so high as to require multi-stage rectification. Other purification procedures may be utilized such as selective adsorption on charcoal, liquid fractionation and the like, but all such procedures must necessarily add to the total expense of the process.

It has also been proposed to employ hydroformer off-gases without preliminary purification for the desulfurization of sulfur-containing fractions. However, it has been found that when unpurified hydroformer off-gases are utilized as the sole source of hydrogen certain economic factors interfere with the full utilization of the hydrogen in the original gases. The desulfurization recycle gas stream, which is necessary in order to maintain the desired hydrogen partial pressure, becomes increasingly dilute in hydrogen as the latter is consumed in the desulfurization reaction. The result is that the concentration of methane in the recycle system builds up to such a degree that the dilution effect begins to inhibit the reaction, and there is an increase in the rate of coking and hydrocarbon cracking. Moreover, such large volumes of gas must be recycled that the cost in equipment, power and heating becomes excessive. When the hydrogen content in the recycle gas drops to 25%, for example, it is then necessary to circulate and reheat 3 volumes of methane for each volume of hydrogen recirculated. The heat capacity of methane at the reaction temperature is a serious economic factor as is evident from the data:

|  | Heat capacity, cal./deg. mole | |
|---|---|---|
|  | at 260° F. | at 800° F. |
| $CH_4$ | 9.74 | 13.9 |
| $H_2$ | 6.97 | 7.035 |

The most refractory stocks treated herein comprise mainly the various thermally or catalytically cracked distillates. The hydrodesulfurization of such cracked disstillates requires in the first place fairly severe conditions, i.e. high temperatures, in order to hydrocrack the most refractory sulfur compounds, such as thiophene, which are usually present in considerable quantities. The use of high temperatures in turn necessitates the use of high total pressures to repress hydrocarbon cracking, and high hydrogen partial pressures, inter-alia, to retard coking and deactivation of the catalyst. A principal objective in such hydrodesulfurization treatments has been to achieve a non-regenerative process, whereby the catalyst may be kept on-stream for long periods of time, e.g. three to six months, or at least about 30 days, before regeneration is required to remove coke and other deposits. This objective cannot be achieved in the exhaustive desulfurization of cracked stocks unless high total pressures and high hydrogen partial pressures are employed, conditions which are economically inconsistent with the use of dilute hydrogen streams.

Straight-run stocks, particularly high-boiling fractions, may also require relatively severe process conditions in order to effect complete desulfurization, and/or effective removal of nitrogen bases. Therefore similar difficulties are sometimes encountered in utilizing dilute hydrogen streams for the exhaustive desulfurization and/or denitrogenation of straight-run stocks, crude oils and heavy residual stocks, such as may be employed for cracking charge-stock.

For all the above reasons, in exhaustive desulfurization, it is necessary to remove a bleed stream from the recycle gas system, and either treat it in some type of hydrogen purification system, or burn it as fuel gas. The former alternative is expensive, and the latter is almost equally so in the sense of wasting valuable hydrogen. According to the present invention, this bleed stream is treated in a second catalytic hydrodesulfurization zone with a feed stock which may be at least partially hydrodesulfurized at low temperatures and low hydrogen partial pressures. Desirable feed stocks for the latter type of desulfurization comprise the various straight-run, sulfur-bearing distillates which are obtained by direct distillation of crude oil. It has been found that the sulfur compounds in such distillates are mostly less refractory than those in the cracked stocks. Apparently, in straight-run stocks a larger proportion of the organic sulfur is in the form of mercaptans, disulfides, aliphatic sulfides, thiophanes, etc., which are more readily hydrocracked than thiophenes for example. Accordingly, in order to utilize fully the bleed stream from the first desulfurization reactor, sufficient straight-run distillate is admixed therewith so that the easily decomposed sulfur compounds will be present in sufficient quantity to combine stoichiometrically with a large part, preferably a major part, of the hydrogen in the dilute bleed stream. This operation is preferably conducted using a relatively low sulfur stock on a once-through basis, i.e. without recycle of off-gases. In one modification however, especially where low hydrogen/oil ratios are employed and not all the hydrogen is consumed, it has been found that the liquid condensate from the second desulfurization reaction is capable of absorbing sufficient of the methane from the now methane-rich gas stream so that the remaining gas phase is sufficiently hydrogen-rich to be recycled to the first or second desulfurization recycle stream, without using auxiliary $H_2$ purification equipment.

It has now been found that a substantial desulfurization of straight-run stocks may be obtained with gas streams containing e.g. 30–60% by volume of hydrogen, and that as much as 50–90% of such hydrogen may be utilized in the reaction. Further, such results may be obtained under mild reaction conditions, e.g. temperatures of about 550–700° F., pressures of about 0–2000 p.s.i.g., and space velocities of about 1–20 volumes of liquid feed per volume of catalyst per hour. These conditions permit the use of low hydrogen partial pressures without excessive coking of the catalyst. The ratio of pure hydrogen to feed may be for example between about 20 and 400 S.C.F. per barrel of liquid feed, and preferably between about 30 and 200 S.C.F. per barrel. These conditions are distinctly different from those usually employed in desulfurization, especially for cracked stocks. The usual conditions comprise for example temperatures of about 650–800° F., pressures of 500–10,000 p.s.i.g., space velocities between about 2 and 10, and pure hydrogen recycle rates between about 600 and 10,000 S.C.F. per barrel of feed. These latter conditions may be employed for the first desulfurization zone herein.

If cracked stocks are employed in the first desulfurization zone, some overlapping in temperature ranges for the first and second desulfurization zones is permissible, for example 650°–800° F. in the first zone and 550°–700° F. in the second. However, where the same straight-run stocks are employed in both zones, the advantages of multi-stage processing are not obtained unless different temperature conditions are employed for the several zones, e.g. 650–800° F. for the first zone, 550–650° F. for the second zone, etc.

The catalysts employed in the separate desulfurization zones herein may comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides of the metals in groups VIB and VIII of the periodic table, as for example the oxides or sulfides of molybdenum, tungsten, iron, cobalt, nickel, chromium and the like. Vanadium compounds may also be employed in some cases. A particularly active combination consists of a group VIB metal oxide or sulfide with a group VIII metal oxide or sulfide. For example compositions containing both molybdenum oxide and cobalt oxide, molybdenum oxide and nickel oxide, tungsten sulfide and nickel sulfide, and the like may be employed. The catalysts employed in the two desulfurization zones may be the same or different.

A particularly active catalyst consists of the composite known as cobalt molybdate, which actually appears to be a mixture of cobalt and molybdenum oxides wherein the molecular ratio of CoO to $Mo_3O$ may be between about 0.4 and 5.0. This catalyst, or any of the above catalysts may be employed in unsupported form, or alternately it may be distended on a suitable adsorbent oxide carrier such as alumina, silica, zirconia, thoria, magnesia, titania, bauxite, acid activated clays, or any combination of such materials. Of the foregoing carriers, it has been found that the preferred material is alumina and especially alumina containing about 3–8% by weight of silica.

In the preparation of an unsupported cobalt molybdate catalyst the catalyst can be coprecipitated by mixing aqueous solutions of, for example, cobalt nitrate and ammonium molybdate, whereby a precipitate is formed. The precipitate is filtered, washed, dried and finally activated by heating to about 500° C. Alternatively, the cobalt molybdate may be supported on alumina by coprecipitating a mixture of cobalt, aluminum and molybdenum oxides. A suitable hydrogel of the three components can be prepared by adding an ammoniacal ammonium molybdate solution to an aqueous solution of cobalt and aluminum nitrates. The precipitate which results is washed, dried and activated. In still another method a washed aluminum hydrogel is suspended in an aqueous solution of cobalt nitrate and an ammoniacal solution of ammonium molybdate is added thereto. By this means a cobalt molybdate gel is precipitated on the alumina gel carrier. Catalyst preparations similar in nature to these and which can also be employed in this invention have been described in U.S. Patents 2,369,432 and 2,325,033.

Still other methods of catalyst preparation may be employed such as by impregnating dried carrier material, e.g. an alumina-silica gel, with an ammoniacal solution of cobalt nitrate and ammonium molybdate. Preparations of this type of cobalt molybdate catalyst are described in U.S. Patent 2,486,361. In yet another method for preparing impregnated molybdate catalyst the carrier material may be first impregnated with an aqueous solution of cobalt nitrate and thereafter impregnated with an ammoniacal molybdate. Alternatively, the carrier may be impregnated with both solutions in reverse order. Following the impregnation of the carrier by any of the foregoing methods the material is drained, dried and finally activated in substantially the same manner as is employed for the other catalysts. In the preparation of impregnated catalysts where separate solutions of cobalt and molybdenum are employed, it has been found that it is preferable to impregnate the carrier first with molybdenum, e.g., ammoniacal ammonium molybdate, and thereafter to impregnate with cobalt, e.g. aqueous cobalt nitrate, rather than in reverse order.

In yet another method for the preparation of suitable catalyst a gel of cobalt molybdate can be prepared as described hereinbefore for the unsupported catalyst, which gel after drying and grinding can be mixed with a ground alumina, alumina-silica or other suitable carrier together with a suitable pilling lubricant or binder which mixture can then be pilled or otherwise formed into pills or larger particles and activated.

In yet another modification finely divided or ground molybdic oxide can be mixed with suitably ground carrier such as alumina, alumina-silica and the like in the presence of a suitable lubricant or binder and thereafter pilled or otherwise formed into large agglomerated particles. These pills or particles are then subjected to a preliminary activation by heating to 600° C., for example, and are thereafter impregnated with an aqueous solution of cobalt nitrate to deposit the cobalt thereon. After draining and drying the particles are heated to about 600° C. to form the catalyst.

It is apparent from the foregoing description of the different types of cobalt molybdate catalyst that either an unsupported catalyst, in which case the active agents approximate 100% of the composition, or a supported catalyst wherein the active agents, e.g. cobalt and molybdenum oxides, comprise from about 7 to 22% by weight of the catalyst composition may be employed.

The catalyst employed for the hydroforming operation which produces the hydroformer make-gases is not a critical feature of the present invention, although it does have a direct bearing thereon. Certain reforming catalysts, the most noteworthy of which consists of platinum deposited on alumina, are very selective in their hydroforming activity, and generally produce only small amounts of methane. Typical off-gases from such a reformer contain about 80–90% by volume of hydrogen. Other catalysts may be employed which are somewhat less selective, producing relatively more methane. Such catalysts include for example the cobalt molybdate above discussed, and in general the above-described transitional metals or metal oxides. These catalysts may produce, under typical reforming conditions, an off-gas which is from 60–80% by volume hydrogen.

It should be understood that the recycle gases discussed herein, either in the hydroformer or in the desulfurizers, may also contain hydrocarbons such as ethane, ethylene, propane and the like. However those materials are ordinarily so soluble in the liquid products that they are effectively removed during high pressure condensation as a solution in the liquid product, from which they are subsequently removed. The same applies to some extent to hydrogen sulfide. It is therefore convenient and sufficiently accurate to characterize the various recycle gases on the basis of their methane/hydrogen ratio.

The desulfurization operations described herein may be effected in any suitable equipment, a particularly satisfactory system comprising fixed bed processes in which the catalyst is disposed in one or more reaction zones and the hydrocarbon fractions to be treated are passed therethrough, either in upward or downward flow, generally concurrently with the stream of hydrogen. In such processes the catalyst may either be disposed to provide for axial flow of gases therethrough, or for radial flow. Fluidized processes in which the catalyst is suspended in one or more of the gaseous reactants and maintained in a state of turbulence in the reaction zone under hindered settling conditions may also be employed. Also, moving bed type processes in which the reactants are passed concurrently or countercurrently to a moving bed of catalyst, or the suspensoid type operation in which the catalyst is carried as a slurry in the reactants may also be employed. Conventional processes using guard reactors to remove impurities from the charge stock prior to treatment may be employed if desired.

Reference is now made to the accompanying flow sheet which illustrates some of the specific features of the invention. The invention should not however be construed as restricted to the details described therein.

The lower half of the flow sheet represents a conventional refining sequence wherein a reduced crude oil from storage tank 1 is pumped via line 2 into a primary fractionating column 3. Straight-run gasoline is taken overhead into line 4 to be used as hereinafter described. Various intermediate boiling fractions may be taken off as side-cuts through lines 5 and 6, for example light and heavy gas oils. These straight-run fractions pass via line 7 to the desulfurizing process hereinafter described.

The bottoms from column 3, which may comprise heavy residual oils or gas oils, is passed via line 9 to thermal coking unit 10. Coking unit 10 is of any suitable design for converting petroleum oils into gases and vapors boiling below a particular end point, and producing a solid residue of coke. Such coking unit may be of the delayed coking type wherein coke is accumulated during a coking period of 15 minutes to 2 hours, for example, and is then removed by suitable means such as with a stream of high velocity water in the well known hydraulic decoking method. In such cases coker 10 represents one of several coking vessels which are employed in sequence for coking and decoking whereby a continuous flow of feed and products may be maintained. In another modification coker 10 may be of the continuous type wherein the oil is continuously passed through a bed of heated pellets of coke or other solid heat transfer material thereby depositing a layer of coke upon such pellets. The pellets containing added coke are removed and may be burned in order to recover the heat value of the coke, and form additional hot pellets for further coking, or such pellets may be screened to recover the smaller pellets which are reheated and returned to the coking zone. In general such coking operations are effected at relatively low pressures such as in the range of atmospheric to 100 pounds per square inch.

Coke is shown in the attached figure as being discharged from vessel 10 through line 11 by any of the foregoing methods. Coker distillate is removed from vessel 10 through line 12 whence it passes through condenser 13 into line 14 and thence to fractionating tower 15. The light gas overhead from fractionating tower 15 passes through lines 16 and 17 into the fuel gas recovery system. Fractionating column 15 discharges cracked gasoline-boiling range stock as a side-cut through line 18 to be utilized in the desulfurization process hereinafter described. Various higher-boiling cracked products may be derived from column 15 for use in the desulfurization process.

The bottoms from column 15 is removed through line 20 and passed into a thermal cracking unit 21 which is operated under sufficient pressure to effect at least a partial cracking of the heavy oil flow therethrough. Alternatively, instead of a thermal cracking unit, a catalytic cracking unit may be substituted for thermal unit 21. Cracked products from cracking unit 21 are then passed via line 22 to fractionating column 23. Gaseous products from the cracking operation are exhausted overhead from column 23 through line 24 to the fuel gas recovery system. Light cracked fractions such as cracked gasoline may be taken as a side-cut from column 23 through line 25, and higher boiling materials such as light cracked gas oils may also be taken off as a side-cut through line 26. Either or both of such cracked distillates then pass through line 27 to the desulfurization system hereinafter described. The heavy bottoms from column 23 is discharged, either through line 30 to fuel oil storage not shown, or through line 31 back to line 9, where it joins the heavy residual from column 3 to be passed as charge stock to coking unit 10.

Obviously, any other type of refinery operation for producing straight-run distillates and cracked distillates from sulfur bearing crude oils may be employed to produce the charge stocks required herein.

Hydrogen for the desulfurization is produced herein by the operation of a catalytic hydroformer 32. This unit is conventional in the art and hence will not be described in detail. The charge stock employed therein consists mainly of gasoline boiling range, predominantly straight-run hydrocarbons. If a sulfur-sensitive catalyst is employed in hydroformer 32, such as platinum-alumina, the charge stock should be essentially free of sulfur. Other hydroforming catalysts such as molybdenum oxide or cobalt molybdate are effective in the presence of sulfur compounds, and hence either sulfur-free or sulfur-containing straight-run gasolines may be employed. If sulfur-containing straight-run gasoline is employed, that material may come directly from distillation unit 3, as by opening valve 33, whereby a part or all of the original straight-run gasoline passes via line 34, line 35, interchanger 36, heater 37, line 38, hydrogen recycle line 39, into the top of hydroformer 32. If sulfur-free stocks are required in the hydroformer they are conveniently derived from the desulfurization of straight-run gasolines to be hereinafter described. These desulfurized gasolines are brought into the top of hydroformer 32 via line 40, line 35, interchanger 36, heater 37, line 38 and hydrogen recycle line 39 as previously described.

The reaction products from hydroformer 32 are removed through line 41, passed in heat exchange with the feed material through interchanger 36, wherein they are at least partially condensed, and then passed via line 42 into gas-liquid separator 44. Reformed gasoline is drawn off through line 45, and hydrogen-rich recycle gas is removed through line 46, the major part of which is continuously recycled via open valve 47, heater 48 and line 49 into hydroformer 32. All of the recycle hydrogen may be admitted to the top of the reformer through line 39 in admixture with the hydrocarbon feed material as previously described. Alternatively, control valves 50 and 51 may be opened to permit a part of the recycle hydrogen to flow via lines 52 and 53, and/or lines 52 and 54 into intermediate mixing zones in hydroformer 32. This latter type of operation provides a more even temperature profile in hydroformer 32, inasmuch as the hydroforming reaction is endothermic and the heated hydrogen side-streams provide compensating sensible heat.

When the recycle gas volume in hydroformer 32 becomes undesirably high, as detected for example by pressure increase, valve 55 is opened to permit the taking off of a hydrogen-rich make-gas through line 56. This make-gas constitutes the primary source of hydrogen for the desulfurization operations to be described hereinafter. The hydrogen concentration therein may vary between about 60% and 90% volume, although other concentrations may occasionally be encountered.

At least a part of the hydroformer make-gases in line 56 are then drawn off through valve 62 and commingled with pre-heated vapors of desulfurization feed stock flowing into line 62a from line 61. The essential characteristic of the feed stock admitted through line 61 is that it should require a high-temperature, hydrogen-consuming desulfurizing and/or denitrogenating treatment. Such distillates preferably consist of cracked gasoline, cracked light or heavy gas oils or blends thereof, full range cracked distillates, or blends of any of those materials with partially desulfurized straight-run materials to be hereinafter described. Virgin straight-run distillates may also be employed, preferably those which are high in sulfur and/or nitrogen, and hence require drastic conditions of treatment. Cracked feed materials may flow from the previously described refinery operations through lines 18 or 27 into makeup feed line 57, and are then passed through interchanger 58, line 59, heater 60 and line 61 into hydrogen make-gas line 62a. Straight-run feed stocks may be derived for example from distillation column 3, whence they flow via lines 5, 6, 7, 8 and 57, interchanger 58, line 59, heater 60, line 61, into hydrogen make-gas line 62a. In any case, the mixture of hydrocarbons and make-gas in line 62a is pumped via line 64 into the top of primary desulfurizer 65 wherein high temperature catalytic hydrodesulfurization is carried out as previously described. Products from primary desulfurizer 65 are removed through line 66, passed in heat exchange relationship with the feed through interchanger 58, and thence through line 68 and condenser 69 into gas-liquid separator 70. Recycle gas is continuously passed via line 71, compressor 72 and line 73 into line 64 wherein it mingles with the incoming feed and fresh hydrogen. The desulfurization reaction is exothermic in nature, and hence it may be desirable to split the recycle stream from line 71 by opening valve 74 whereby a part of the cool hydrogen stream flows through line 75 into an intermediate mixing zone in desulfurizer 65, thereby providing control over the temperature profile therein.

The desulfurized liquid product accumulating in separator 70 is withdrawn through line 76 and passed into fractionating column 77. Column 77 is operated at a lower pressure than prevails in separator 70 by virtue of pressure regulator valve 78. Upon depressurizing the liquid product in column 77, dissolved gases consisting mainly of hydrogen sulfide and light hydrocarbons flash off through line 79, which may connect with the fuel gas recovery line 17. Desulfurized liquid product is taken from column 77 via line 80, and may be passed in whole or in part through line 81 to storage tanks not shown. Alternatively, when cracked gasoline is employed as feed stock, valve 82 may be opened whereby a part of the desulfurized gasoline may be admixed with the desulfurized straight-run gasoline in line 40 which flows as feed to hydroformer 32. Bottoms from column 77 is removed through line 84 and transferred to distillation column 85 wherein any heavier products may be fractionated to produce through overhead line 87 desulfurized stove oil, or diesel oil as the case may be. If any still heavier products have been treated in desulfurizer 65, they are withdrawn as bottoms through line 86 and may be subjected to further cracking operations if desired, or utilized as fuel oil.

In the operation of desulfurizer 65 as above described, the concentration of hydrogen in recycle line 71 will continuously drop due to the consumption of hydrogen in the reaction. As the hydrogen concentration drops, the efficiency of operation in desulfurizer 65 likewise decreases. A point is reached where it is not possible to maintain the desired total pressure and the desired hydrogen partial pressure. It has been found that when operating at total pressures between about 500 and 2000 p.s.i.g., and where the ratio of recycle gas to fresh make-gas is between about 1/1 and 10/1, the recycle stream in line 71 should not be allowed to fall below about 40–60% hydrogen by volume if it is desired to maintain non-regenerative operation in desulfurizer 65. Therefore a hydrogen analyzer recorder controller 88 is provided in the recycle line, and this instrument continuously determines the hydrogen content of the gaseous components from separator 70. By setting the hydrogen controller recorder 88 to control the hydrogen concentration in gas line 71 at some predetermined value, preferably not lower than the stated limits, motor valve 89 will be continuously actuated to permit a greater or lesser proportion of the recycle gas to flow through line 90 into a secondary desulfurizer unit 91 to be hereinafter described. The opening of valve 89 causes a pressure drop in desulfurizer 65, which in turn actuates valve 62 through pressure recorder controller 63 to admit further quantities of fresh hydroformer make-gas. In this manner the desired total pressures and hydrogen partial pressures may be maintained continuously in reactor 65. It will be apparent to those skilled in the art that other instrumentation responsive to process variables may also be employed to control these factors within the stated limits. In all such cases the concentration of hydrogen at some point in the system is used to control the rate of withdrawal of bleed gas through line 90, and directly or indirectly, the rate of admission of make-up hydrogen. The total hydrogen/feed ratio may be controlled for example by varying the recycle gas rate through compressor 72.

The dilute hydrogen stream withdrawn through line 90 is then commingled with straight-run hydrocarbon feed and passed into the top of secondary desulfurizer 91 wherein the dilute hydrogen is utilized for desulfurizing the feed. Feed material for reactor 91 consists of straight-run gasoline and/or straight-run gas oils or stove oils, topped crude oil, or full range, straight-run distillates. These materials may be derived as previously described from fractionating column 3, whence they pass via line 4 or 7 into line 92, through interchanger 93 and line 94, to mingle with the gases in line 90. The desulfurization in reactor 91 is preferably conducted at pressures between about 50 and 2000 p.s.i.g., temperatures between about 550° and 650° F., and feed rates between about 2 and 20 volumes per volume of catalyst per hour. These conditions however may be varied considerably. An essential requirement is that the hydrogen to feed ratio should be low, i.e. between about 20 and 400 s.c.f. of pure hydrogen per barrel of feed. The desulfurized products are withdrawn through line 95, passed in heat exchange relationship with the feed through interchanger 93, which also acts as a condenser, and thence through line 96 to final gas-liquid separator 97. The hydrogen/feed ratio in reactor 91 may be so low that it will be unnecessary to employ separator 97; the methane and small amounts of unreacted hydrogen may remain dissolved in the condensed liquid product at the reactor pressure, and hence the mixture may be flashed directly into a distillation column. If a gas-liquid separator is employed, a pressure relief valve 98 may permit the final off-gases to flow through line 100 into fuel gas line 17. The off-gases in line 100 will consist essentially of methane and hydrogen sulfide, with perhaps 10–25% by volume of hydrogen.

The liquid product from separator 97 is withdrawn through pressure reducing valve 101 and passed via line 102 to fractionating column 103. The dissolved light gases flash off as described and are passed through line 104 into line 100, whence they pass to the fuel gas system. It will be apparent that the gas stream in line 100 may consist entirely of the flash gases from column 103, or they may be in part high-pressure gases from separator 97. In either case, the hydrogen content of the gas stream in line 100 may be utilized as the controlling variable in the operation of reactor 91. To accomplish this end, a second hydrogen analyzer controller recorder 105 may be inserted in line 100 to detect varying hydrogen content. When the hydrogen content rises above a predetermined level, e.g. 10–15% by volume, recorder controller 105 actuates valve 106 in feed line 94 to admit more straight-run feed. When the hydrogen content falls below the predetermined level, valve 106 is actuated to restrict the flow of straight-run feed.

In some cases it will be found that the hydrogen consumption, the hydrogen/feed ratios, the pressures employed in reactor 91, and the temperature in separator 97 are such that a substantial purification of final off-gases is obtained by the selective absorption of methane in the liquid product in separator 97. In such cases it is feasible to utilize the gas phase in separator 97 as a recycle stream to reactor 91. This mode of operation is ordinarily not preferred unless the gas phase in separator 97 has substantially the same, or greater, hydrogen concentration than the hydrogen stream in line 90. To accomplish this type of recycle, valve 98 is closed and valve 107 is opened to permit the flow of recycle gases through line 108.

The fractionation of liquid desulfurized straight-run products in column 103 ordinarily yields a gasoline fraction which is taken off through line 109. This material may constitute the primary feed for hydroformer 32. If it is utilized for that purpose, valve 110 is opened (valve 112 closed) permitting the product to flow via lines 111 and 40 into hydroformer feed line 35. Alternatively, in cases where desulfurizer 91 is operated under such mild conditions as only partially to desulfurize the straight-run feed stock, it may be desirable to treat the gasoline in line 109 under the more severe desulfurization conditions in reactor 65. To accomplish this objective, valve 112 is opened (valve 110 closed) permitting the partly desulfurized straight-run gasoline to flow via line 113 into primary desulfurizer feed make-up line 57. This partly desulfurized stock may constitute either the sole or partial feed to desulfurizer 65. By adjusting the proportion of straight-run to cracked gasoline in the charge stock to desulfurizer 65 it is possible to obtain a final desulfurized gasoline in line 80 which is essentially a blend of cracked and straight-run desulfurized gasolines, and which may constitute the total feed to hydroformer 32.

In a preferred modification of the process, the proportion of straight-run gasoline which is produced through line 111 or line 113 is so adjusted as to provide, by the hydroforming thereof in hydroformer 32, a sufficient amount of hydrogen to accomplish its own desulfurization, and the desulfurization of at least the amount of cracked stock derived by coking and/or cracking of the higher boiling products derived from the crude oil which furnished the original straight-run gasoline. This type of endogenous hydrogen balance is particularly desirable in refining areas wherein predominantly high sulfur crude oils are to be treated, and wherein such crude oils are predominantly naphthenic in character.

The bottoms from column 103 constitutes desulfurized straight-run material suitable for the production of stove oil or Diesel oils and the like. This material for example may be withdrawn through line 115 and transferred via line 84 to column 85 for final fractionation into the desired products.

In order to further illustrate a specific mode of operation, the following example is cited which is typical of the results obtainable.

*Example*

A platinum-alumina hydroforming unit of conventional design is found to produce, by the hydroforming of 1130 barrels/day of 450° F. end point straight-run gasoline, 1000 M s.c.f. per day of make-gases, which analyze approximately 85% hydrogen and 15% methane by volume. These gases are to be utilized in a two-stage desulfurization process employing two separate reactors, both of which are packed with a cobalt-molybdate type catalyst consisting essentially of 3% by weight of CoO and 9% by weight of $MoO_3$ supported on a 5% $SiO_2$–95% $Al_2O_3$ carrier in coprecipitated form. The catalyst particles are in the form of ¼ inch pellets, and are arranged in the reactors to permit radial flow of gases.

Into the first desulfurizer is passed, at the rate of 1785 barrels per day, a blend of about 65% cracked gasoline and 35% straight-run gasoline, the blend containing 2.3% sulfur by weight, and 31% by volume of olefins. This feed material is fed through the desulfurizer at a temperature of about 700° F., a pressure of 1000 p.s.i.g., and at a rate of 5 liquid volumes per volume of catalyst per hour, in admixture with 1000 M s.c.f./day of the above described off-gases from the hydroformer. A recycle stream is maintained in the process and its composition is continuously controlled so that the hydrogen concentration therein ranges between about 55% and 65% by volume. Under these conditions the total hydrogen gas input to the reactor, i.e. both recycle and make-up, amounts to about 3100 s.c.f. per barrel of feed, or 2000 s.c.f. of pure hydrogen per barrel. The volume-ratio of recycle gas to fresh make-gas is about 4.5. The desired hydrogen concentration in the recycle stream is maintained by means of a hydrogen analyzer controller in the recycle line, which actuates an exhaust valve to bleed off gases when the hydrogen content decreases below the desired level. Under these conditions 375 M s.c.f. per day of bleed-gas is obtained, and the hydrogen consumed amounts to 625 M s.c.f. per day. Since 850 M s.c.f. per day of hydrogen was supplied, it will be apparent that 625/850, or 73.5%, of the original hydrogen was utilized to obtain an off-gas which is 60% hydrogen and 40% methane by volume. The final desulfurized product contains about 0.005 percent sulfur.

The bleed-gas from the first desulfurizer is then employed in a second desulfurizer for desulfurizing a sour, straight-run stove oil having a boiling range of 350°–600° F., and containing 1.2% by weight of total sulfur. Utilizing reaction conditions as follows:

Temperature _____ °F__ 625
Pressure _____ p.s.i.g__ 200
LHSV _____ 5 it is found that in order to obtain 80% utilization of the hydrogen supplied, it is necessary to react the 375 M s.c.f. of bleed-gas from the first desulfurizer with 4500 barrels per day of the straight-run stove oil. The resulting average $H_2$/oil ratio is 50 s.c.f./barrel. The final off-gases are about 23% by volume hydrogen, and the desulfurized liquid product is found to contain 0.05% sulfur, and 0.0002% of mercaptan sulfur. The total hydrogen utilization of the original hydroformer make-gas in both desulfurization units is 94.5%. The final off-gases from the second desulfurizer contain most of the hydrogen sulfide from both desulfurization units. It is ordinarily preferable to remove most of the $H_2S$ from such gases before utilizing the same as fuel gas.

Results very similar to those outlined in the above example are obtained when utilizing other desulfurization catalysts, other feed stocks, and other process conditions within the scope of the general disclosure herein. Those skilled in the art will readily understand that various modifications are feasible. The essential features reside in first exhaustively treating a feed stock under high hydrogen partial pressures until the recycle gas reaches an undesirably low hydrogen level, and utilizing a bleed stream therefrom for desulfurizing a predominantly straight-run feed at low hydrogen partial pressures, and preferably under once-through conditions.

The foregoing disclosure should therefore not be considered as limiting in scope since many variations may be made by those skilled in the art without departing from the scope or spirit of the following claims.

We claim:

1. A method for effecting substantially complete utilization of an impure hydrogen supply stream by chemical consumption in hydrodesulfurization reactions without employing extraneous purification measures, said supply stream containing about 60–90% by volume of hydrogen the remainder being predominantly methane, which comprises first utilizing said supply stream as substantially the sole source of makeup hydrogen in an internal-hydrogen-recycle severe desulfurization zone wherein a first sulfur-containing mineral oil is subjected to catalytic hydrodesulfurization at a temperature between about 650° and 800° F., a pressure between about 500 and 10,000 p.s.i.g. and a total hydrogen/feed ratio between about 600 and 10,000 s.c.f. per barrel, and the effluent therefrom is cooled and condensed at substantially the preceding reactor pressure to recover a desulfurized liquid product and a hydrogen-containing recycle gas, returning part of said recycle gas to said severe desulfurization zone without intervening purification to form said internal recycle, withdrawing the entire remainder of said recycle gas for utilization as hereinafter prescribed, controlling the rate of said withdrawal in inverse response to the hydrogen content of said recycle gas so as to (1) maintain a hydrogen/methane mole-ratio therein greater than about 0.66 and (2) assure that a major portion of the makeup hydrogen supply stream admitted to said severe desulfurization zone is chemically consumed therein, admitting said impure supply stream to said severe desulfurization zone at a rate controlled to maintain a constant pressure therein, utilizing said withdrawn portion of recycle gas without intervening purification as substantially the sole source of makeup hydrogen in a mild desulfurization zone wherein a sulfur-containing straight-run distillate is subjected to catalytic hydrodesulfurization at a pressure between about 50 and 2000 p.s.i.g., a temperature between about 550° and 700° F., and a hydrogen/feed ratio between about 20 and 400 s.c.f per barrel, controlling the residence time in said mild desulfurization zone so as to consume a major portion of the withdrawn hydrogen supplied thereto, and recovering a desulfurized liquid product, the catalyst employed in each of said desulfurization zones consisting essentially of an adsorbent oxide carrier containing distended thereon a minor proportion of a material selected from the class consisting of the oxides and sulfides of group VI B metals, and a minor proportion of a material selected from the class consisting of the oxides and sulfides of the metals from the 4th period of group VIII of the periodic table.

2. A process as defined in claim 1 wherein said impure hydrogen supply stream is derived from the catalytic reforming of a straight-run naphtha.

3. A process as defined in claim 1 wherein the effluent from said mild desulfurization zone is cooled and condensed at substantially the preceding reactor pressure, and the entire supernatant gas phase is recycled without intervening purification to said mild desulfurization zone, the conditions of pressure and hydrogen rates therein being so controlled that upon condensation of said effluent said supernatant gas phase contains a hydrogen/methane ratio at least as high as said withdrawn portion of recycle gas supplied thereto.

4. A process as defined in claim 1 wherein said straight-run distillate consists essentially of a straight-run gasoline, and said first sulfur-containing mineral oil consists essentially of a cracked gasoline.

5. A process as defined in claim 1 wherein said straight-run distillate consists essentially of a fraction boiling above the gasoline range, and said first sulfur-containing mineral oil consists essentially of a cracked gasoline.

6. A process as defined in claim 1 wherein the catalyst employed in each of said hydrodesulfurization zones consists essentially of a minor proportion of cobalt molybdate supported on a carrier which is essentially alumina.

7. A process as defined in claim 6 wherein the catalyst employed in each of said hydrodesulfurization zones is maintained on-stream for at least about 30 days between regenerations.

References Cited in the file of this patent
UNITED STATES PATENTS

| | | |
|---|---|---|
| 2,355,366 | Conn | Aug. 8, 1944 |
| 2,647,076 | Haresnape et al. | July 28, 1953 |
| 2,672,433 | Porter et al. | Mar. 16, 1954 |
| 2,763,358 | Linn et al. | Sept. 18, 1956 |
| 2,769,753 | Hutchings et al. | Nov. 6, 1956 |
| 2,833,698 | Patton et al. | May 6, 1958 |